United States Patent [19]

Weiss

[11] 4,446,954
[45] May 8, 1984

[54] CENTRIFUGAL CLUTCH FOR POWER SAWS

[75] Inventor: Hermann Weiss, Grossbottwar, Fed. Rep. of Germany

[73] Assignee: Andreas Stihl, Waiblingen, Fed. Rep. of Germany

[21] Appl. No.: 316,569

[22] Filed: Oct. 30, 1981

[30] Foreign Application Priority Data

Nov. 3, 1980 [DE] Fed. Rep. of Germany ....... 3041213

[51] Int. Cl.³ ...................... F16D 43/24; F16D 43/18; B23D 57/02; B27B 17/10
[52] U.S. Cl. .............................. 192/105 CD; 192/75; 192/103 B; 192/104 B; 30/381; 30/382
[58] Field of Search .................. 192/75, 89 W, 103 B, 192/104 B, 105 CD; 30/381, 382; 188/184, 185

[56] References Cited

U.S. PATENT DOCUMENTS

| 2,392,950 | 4/1943 | Russell | 188/184 |
| 2,808,905 | 10/1957 | Bohl | 188/184 |
| 3,169,618 | 1/1962 | Hoffmann | 192/105 CD |
| 3,839,795 | 10/1974 | Dooley | 192/103 C X |
| 3,845,672 | 11/1974 | Goscenski | 192/103 A X |
| 3,970,178 | 7/1976 | Densow | 30/381 X |
| 4,053,980 | 10/1977 | Poehlman | 30/381 |
| 4,324,045 | 4/1982 | Höppner et al. | 30/381 |

FOREIGN PATENT DOCUMENTS

| 685361 | 4/1964 | Canada | 192/105 CD |
| 1139101 | 6/1957 | France | 192/105 CD |
| 632851 | 11/1978 | U.S.S.R. | 188/185 |

Primary Examiner—Rodney H. Bonck
Assistant Examiner—David D. House
Attorney, Agent, or Firm—Walter Ottesen

[57] ABSTRACT

A centrifugal clutch for power saws. The clutch includes a rotating driven centrifugal weight carrier, and a clutch drum which is concentric to the axis of rotation of the carrier. At least one centrifugal weight engages the clutch drum at predetermined speed of the carrier. The centrifugal weight is coupled with at least one return weight in such a manner that the return weight opposes the pressing force of the centrifugal weight when the speed increases over a certain level.

18 Claims, 4 Drawing Figures

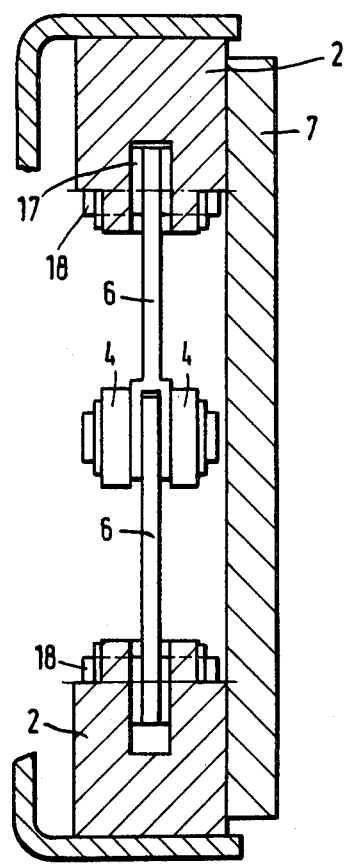
Fig.3
Fig.4
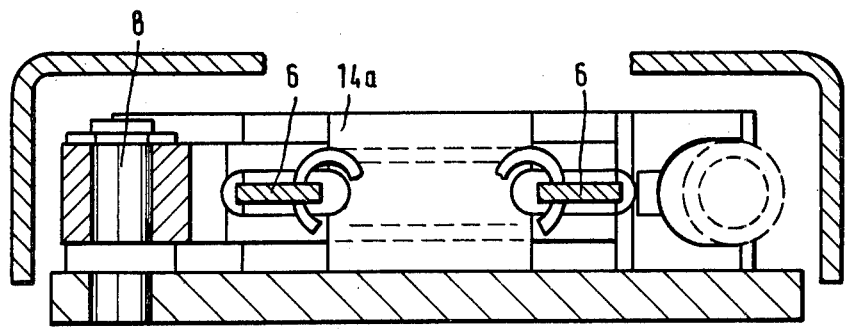

CENTRIFUGAL CLUTCH FOR POWER SAWS

FIELD OF THE INVENTION

The present invention relates to a centrifugal clutch for power saws, and includes a rotating driven centrifugal weight carrier, and a clutch drum which is concentric to the axis of rotation of the carrier; at least one centrifugal weight engages the clutch drum at a predetermined speed of the carrier.

BACKGROUND OF THE INVENTION

Centrifugal clutches are installed in power saws; these clutches transmit the torque of the motor shaft, after exceeding a predetermined speed, to the saw tool, for instance a saw chain. This transmitted torque increases as the square of the speed. This transmission characteristic has no effect on normal saw operation. If, however, the saw strikes an obstacle, kickbacks or recoils result as a consequence of the reaction force, the intensity of which can be very great. As a result, the operator of the saw, and also individuals located in his vicinity, are in danger, because the saw can no longer be securely held, particularly since obstacles and hence kick-backs of the saw generally arise unexpectedly.

SUMMARY OF THE INVENTION

It is an object of the present invention to reduce the intensity of kick-backs or recoils acting on the saw operator to a harmless level.

The centrifugal clutch of the present invention is characterized primarily in that the centrifugal weight is coupled with at least one return weight in such a way that the return weight opposes the pressing force of the centrifugal weight when the speed increases over a certain level.

With this embodiment of the centrifugal clutch, the torque to be transmitted from the motor shaft to the saw tool can be limited to a value within the speed range prescribed for the operation, with such value being sufficient for the drive during normal operation, while permitting the reaction forces which arise during kickback to be only fractionally effective. The clutch therefore operates as an overload clutch which considerably reduces the intensity of kick-backs. This gives rise to a greater safety for the operator of the saw against the dangers which occur during kick-backs.

According to some specific embodiments of the present invention, the return weight may be arranged in the region of a pivotal connection of a knee lever, the free ends of which are movably connected with the centrifugal weight or with an abutment. One end of the centrifugal weight may be pivotally mounted on the carrier, with the knee lever engaging the other free end of the centrifugal weight. One end of the knee lever may project into a recess of the centrifugal weight, with a pin mounted in the centrifugal weight passing through this projecting lever end; this pin may engage in a slot of the knee lever.

The abutment may be a pin held by the carrier.

The rest position of the knee lever may be determined by an abutment on the carrier, preferably by the drive shaft. The knee lever may be held in the rest position by a prestressable spring.

The return weight may be arranged in such a way that its mass is symmetrical, preferably concentric, to the pivot point of the knee lever.

Two centrifugal weights located diametrically across from each other may be provided, and may be connected with each other by a respective, approximately tangentially arranged, knee lever, with the abutment of each knee lever being provided on one of the centrifugal weights in the region of its mounting on the carrier. The legs of the two knee levers may be approximately parallel and opposite to each other, and may be interconnected with respective prestressed springs. The two knee levers may rest against a common abutment of the carrier, which abutment determines the rest position of the knee levers, preferably by means of the return weights carried by the knee levers. The return weights connected with the knee levers may be located diametrically across from each other. The centers of gravity of the centrifugal weight, and of the return weight associated therewith, may be located on different radials of the carrier; the centers of gravity being operative for the application of the centrifugal forces.

The mass and orientation of the centrifugal weights and of the return weights, as well as the return springs associated therewith, may be of such a size that the contact pressure of the centrifugal weights against the clutch drum does not exceed a predetermined maximum value when an upper limit of the speed is exceeded. This size may be selected in such a way that the contact pressure of the centrifugal weights does not fall below a minimum value when the upper limit value of the speed is exceeded, said minimum value being greater than the contact pressure which is necessary for transmitting the torque required for normal saw operation.

BRIEF DESCRIPTION OF THE DRAWING

The invention will now be described with reference to the drawing wherein:

FIG. 3 is a section taken along line III—III in FIG. 2; and

FIG. 4 is a section taken along line IV—IV in FIG. 2.

DESCRIPTION OF THE PREFERRED EMBODIMENTS OF THE INVENTION

Figure 1:
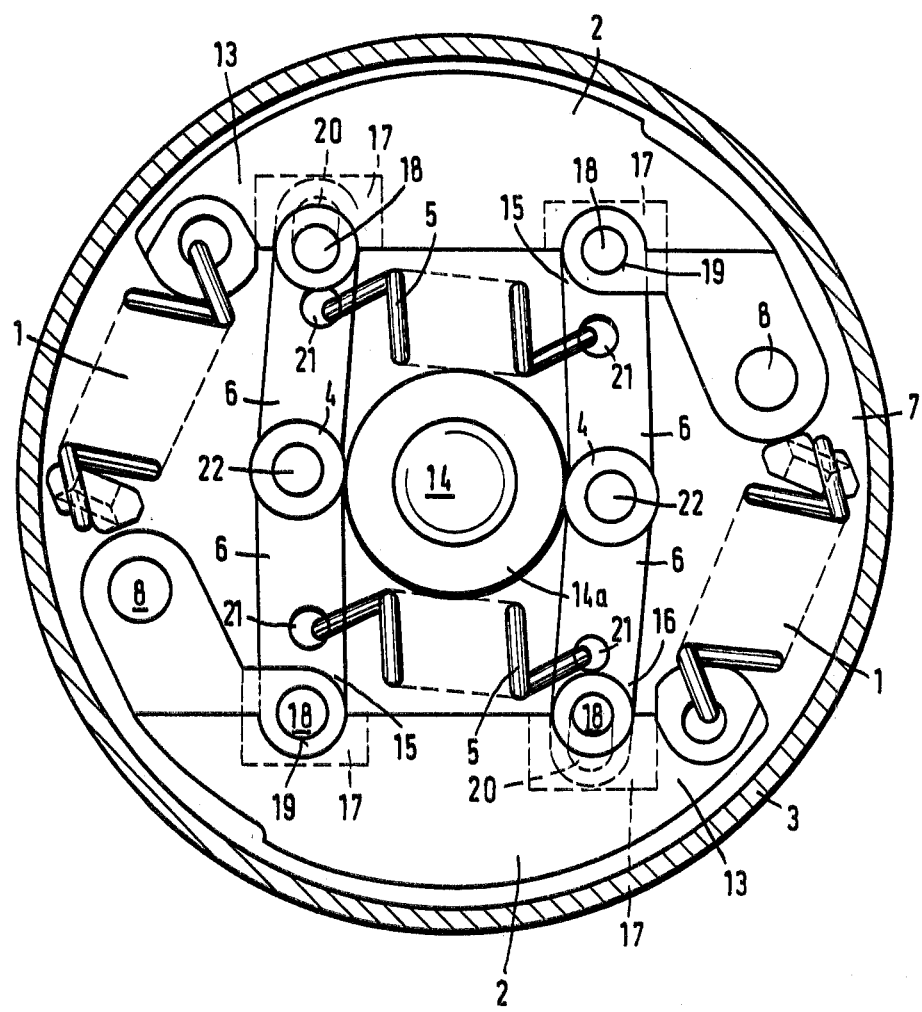
FIG. 1 is a cross-section of one inventive embodiment taken through the clutch housing containing the clutch parts, and is a plan view at standstill of the clutch.

Referring now to the drawings in detail, a plate-like carrier 7 is rigidly connected to a central drive shaft 14, so that the carrier 7 is rotatably driven about the axis of the shaft 14. The carrier includes bolts 8 which engage bores 9 in the region 10 of the fly weights 2. In their rest position, the fly weights 2 are held by pre-tensioned return springs 1 anchored to attachment lugs 11 on the carrier 2. At their respective other ends, the return springs 1 engage openings 12 in the free ends 13 of the fly weights 2.

Figure 2:
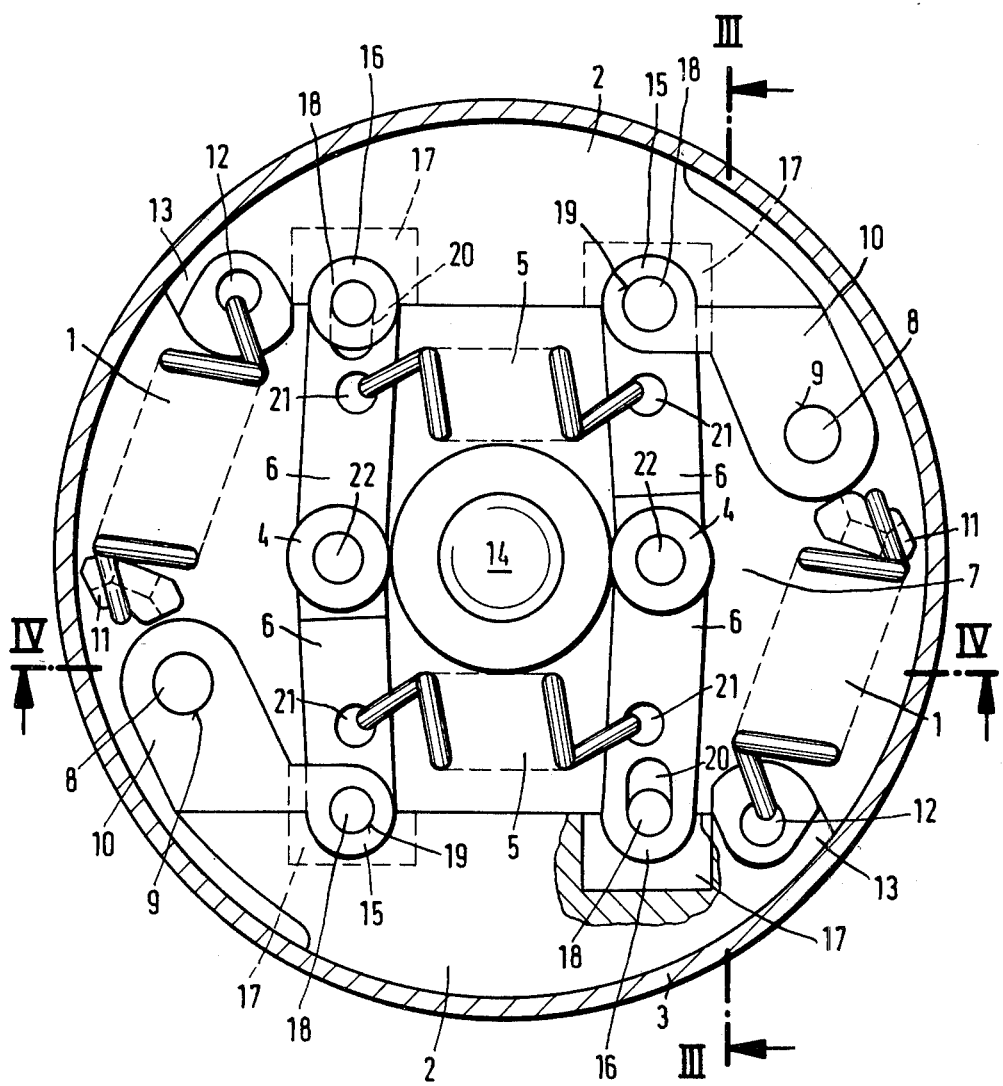
FIG. 2 is a cross-section in conformity with that of FIG. 1, in the operating position of the clutch.

As a predetermined speed, under centrifugal force and against the force of return springs 1, two centrifugal or fly weights 2 pivot about a pin or bolt 8 into the position illustrated in FIG. 2. In this position, the two centrifugal weights 2 positively engage the wall of a clutch drum 3, which coaxially surrounds the shaft 14. Preferably, the surfaces which come into contact with each other are provided with friction linings.

The centrifugal weights 2 are connected to bent or knee levers 6 which are arranged on both sides of the drive shaft 14. Both legs of each knee lever 6 are pivotally connected with each other by a pin or bolt 22, with a return weight 4 being arranged in the region of the pivotal connection. Preferably, the return weight 4 is arranged in such a way that its mass is symmetrical to the pivot point of the pivotal connection. In the embodiment, the return weight 4 is concentric to the pin 22.

The free ends 15, 16 of the knee lever 6 respectively engage in correspondingly embodiment recesses 17 in the centrifugal weights 2. The ends 15, 16 are respectively held in these recesses 17 by one of four pins or bolts 18, which are fastened to the centrifugal weights 2. The pins 18 respectively pass through openings 19 or 20 in the free ends 15 or 16 of the knee levers 6. The two free lever ends 15 are respectively located in the vicinity of the pivot pin 8 of the centrifugal weight 2 associated therewith. The openings 19 provided in these lever ends 15 are cylindrical in conformity with the pin 18, while the opening 20 respectively provided in the free lever end 16 is embodied as a slot, so that a pin-slot-guidance results between the knee lever and the end 13 of the associated centrifugal weight 2. This arrangement of the knee levers makes possible a pivotal movement of the centrifugal weights 2 within the limits determined by the slots 20 without a substantial change of position of the knee levers.

The knee levers, which are approximately tangential and mirror-inverted axially symmetrical to the shaft 14, extend between the centrifugal weights 2 and approximately parallel to each other. The knee levers 6 are connected with each other by two tension springs 5, the ends of which engage corresponding openings 21 of the knee levers. The knee levers 6, within a predetermined speed range, are held in a prestressed rest position by the springs 5, which are also axially symmetrical to the shaft 14. In so doing, the knee levers 6 engage a flange 14a of the drive shaft 14. Separate abutments can also be provided for the knee levers.

In the rest position of the clutch, i.e. during standstill of the shaft 14, the centrifugal weights 2 are swung or pivoted inwardly under the force of their return springs 1, whereby the pins 18 rest against the inner ends of the associated slots 20 (FIG. 1).

If the shaft 14 is driven, then beyond a predetermined lower limiting speed, for instance at 3000 revolutions per minute, the centrifugal force is so great that the centrifugal weights 2 pivot under centrifugal force, and against the force of the springs 1, approximately radially outwardly about the pins 8, coming into engagement against the driven drum 3 (FIG. 2), as a result of which the drum is taken along therewith. The knee levers 6 under these circumstances are unchanged, approximately in an extended position, with the pins 18 resting against the outer ends of the slots 20. The surface or contact pressure of the centrifugal weights 2 against the drum 3 increases with increasing speed, because the centrifugal force increases; however, the return force of the springs 1 remains constant.

The torque which can be transmitted by the clutch thus increases, and in particular increases as the square of the speed. The knee levers are ineffective up to an upper limit of the speed, for instance up to 5650 revolutions per minute, because the springs 5 are large enough that their force exceeds the centrifugal force which acts on the return weights 4 as long as the upper limit of the speed is not attained. If the speed exceeds this upper limit, the centrifugal force on the return weights 4 becomes greater than the force of the springs 5; the return weights 4 therefore attempt to move outwardly and to bend the knee levers 6, which consequently act via the pin-slot-guides 18, 20 on the centrifugal weights 2 in the sense of a return force. However, since the centrifugal forces on the return weights 4 on the one hand, and on the centrifugal weights 2 on the other hand, have different directions, these forces are equalized by appropriately dimensioning the associated masses, so that the centrifugal weights 2 are not lifted from the clutch drum 3, but rather only the engagement pressure thereof no longer increases with further increase of speed. Therefore, the torque which can be transmitted by the clutch remains nearly constant in the range above the upper limit of the speed. The clutch is of such a size that the transmitted torque is greater than that which is necessary for the normal operation of the power saw. Thus, the saw can also be operated in a speed range above the upper limit of the speed, without the clutch slipping.

Since, however, the drive torque to be transmitted to the saw or the saw chain is limited, when the saw encounters an obstacle, the reaction forces corresponding to the drive torque can also only be transmitted with a corresponding limitation. The reaction moment of the recoil or kick-back is therefore limited by the clutch, because the transmitted drive torque cannot exceed the value which results from the vector sum of the operative centrifugal forces. Tests of a power chain saw have shown that the kick-back or recoil force, which is effective tangentially to the reversing radius of the saw chain, is transmitted only to the extent of one-third to one-fourth of that value which is effective with standard centrifugal clutches as a reaction force against the saw body or at the saw handles. The inventive clutch is therefore an overload clutch which to a large extent uncouples the mass inertia moment of the drive motor having a gear unit from the saw tool during kick-back or recoil.

The centrifugal clutch according to the present invention is suitable not only for use with power saws, but can also be used, for instance, with cutting discs.

The present invention is, of course, in no way restricted to the specific disclosure of the specification and drawings, but also encompasses any modifications within the scope of the appended claims.

What I claim is:

1. A centrifugal clutch for a motor-driven chain saw subjected to kickback during use thereof by an operator, the centrifugal clutch comprising:
   a rotating carrier plate driven by the motor and defining an axis of rotation;
   a drum arranged in surrounding relationship to said carrier plate and operatively connected to the saw chain for driving the same;
   centrifugal means mounted on said plate for engaging said drum at a first predetermined rotational speed, said centrifugal means including: a pair of diametrically adjacent centrifugal weights pivotally mounted on said plate so as to be movable between a first and a second position, and, spring means for spring loading said centrifugal weights;
   said weights being movable from said first position to said second position against the force of said spring means in response to said first rotational speed, said weights engaging said drum at said second position for holding the same with said plate thereby driving the saw chain, the holding force between said weights and said drum increasing with increasing rotational speed;

lever means connected between said weights and having return weight means mounted thereon responsive to a second predetermined rotational speed greater than said first rotational speed; and, connection means for connecting said lever means to said weights to permit unimpeded movement of said weights relative to said lever means and to actively engage said weights to limit the magnitude of said holding force between said weights and said drum when said second predetermined rotational speed is reached thereby preventing the kickback condition.

2. A centrifugal clutch according to claim 1, said lever means including a pair of knee levers, each knee lever having two legs, one end of each of said legs being pivotably connected to one another, one of the other ends of said legs being connected to one of said centrifugal weights in such a way as to be movable relative thereto, said weight means including two return weights mounted on respective ones of said knee levers and mounted thereon in the region of the pivotal leg connection thereof.

3. A centrifugal clutch according to claim 2, in which each of said centrifugal weights has two ends, one of which is pivotably supported by said carrier, the other of which is engaged by said other end of one of said legs of said knee lever.

4. A centrifugal clutch according to claim 3, in which said other end of each of said centrifugal weights is provided with a recess, said other end of one of said legs of said knee lever is provided with a slot and extends into said recess; and said other end of said centrifugal weight is further provided with a pin which passes through said slot.

5. A centrifugal clutch according to claim 2, in which said carrier plate is provided with an abutment mounted thereon for determining the rest position of said knee levers.

6. A centrifugal clutch according to claim 5, in which said abutment is a drive shaft to which said carrier plate is rigidly connected.

7. A centrifugal clutch according to claim 5, which includes resilient means interconnecting said knee levers for holding the same against said abutment in said rest position.

8. A centrifugal clutch according to claim 2, in which each of said return weights is arranged in such a way that its mass is symmetrical to the pivotal leg connection of the knee lever upon which the return weight is mounted.

9. A centrifugal clutch according to claim 1, said centrifugal weights being located diametrically across from each other in said drum, each of said centrifugal weights having two ends, one of which is pivotally supported by said carrier and the other end of which is engaged by said spring means, said lever means including a pair of knee levers, each knee lever having two legs, one end of each of said legs being pivotally connected to one another, one of the other ends of one of said legs being connected to one of said centrifugal weights in such a way as to be movable relative thereto, and the other end of the other one of said legs being pivotally connected to the other one of said centrifugal weights.

10. A centrifugal clutch according to claim 9, wherein said two knee levers are approximately parallel to one another; and wherein the clutch comprises: abutment means mounted on said carrier plate; and, resilient spring means interconnecting said pair of knee levers for resiliently holding said knee levers against said abutment means during normal operation of the chain saw up to said second predetermined rotational speed.

11. A centrifugal clutch according to claim 10, said abutment means being a single abutment disposed between said knee levers for determining the rest position thereof.

12. A centrifugal clutch according to claim 11, in which said return weight means including two return weights mounted on respective ones of said knee levers so as to rest against said abutment.

13. A centrifugal clutch according to claim 12, in which said return weights are located diametrically across from one another.

14. A centrifugal clutch according to claim 13, in which the centers of gravity of said centrifugal weights and said return weights associated therewith are located on different radials of said carrier plate.

15. A centrifugal clutch according to claim 10, the mass and orientation of said centrifugal weights and said return weights, and the size of said spring means and said resilient spring means being such that the contact pressure of said centrifugal weights against said drum does not exceed a predetermined maximum value when said second predetermined rotational speed is exceeded.

16. A centrifugal clutch according to claim 15, in which said mass, orientation, and sizes are such that said contact pressure of said centrifugal weights against said drum does not fall below a minimum value, which is greater than the contact pressure necessary for transmitting the torque required for normal saw operation, when said predetermined second rotational speed is exceeded.

17. A centrifugal clutch according to claim 1, said lever means including a pair of knee levers connected between said weights; said return weight means including two return weights mounted on respective ones of said knee levers at the region of the pivotal knee connection thereof; a single abutment disposed between said knee levers; and resilient means interconnecting said pair of knee levers for resiliently holding said knee levers against said single abutment during normal operation of the chain saw up to said second predetermined rotational speed.

18. A centrifugal clutch for a motor-driven chain saw subjected to kickback during use thereof by an operator, the centrifugal clutch comprising:

a rotating carrier plate driven by the motor and defining an axis of rotation;

a drum arranged in surrounding relationship to said carrier plate and operatively connected to the saw chain for driving the same;

centrifugal means mounted on said plate for engaging said drum at a first predetermined rotational speed, said centrifugal means including: a pair of diametrically adjacent weights pivotally mounted on said plate so as to be movable between a first and a second position, and, spring means for spring loading said centrifugal weights;

said weights being movable from said first position to said second position against the force of said spring means in response to said first rotational speed, said weights engaging said drum at said second position for holding and rotating the same with said plate thereby driving the saw chain, the holding force between said weights and said drum increasing with increasing rotational speed;

a pair of knee levers connected between said weights and having return weight means mounted thereon responsive to a second predetermined rotational speed greater than the said first rotational speed;

a single abutment disposed between said knee levers; and, resilient means interconnecting said pair of knee levers for resiliently holding said knee levers against said single abutment.

* * * * *